Patented Dec. 9, 1952

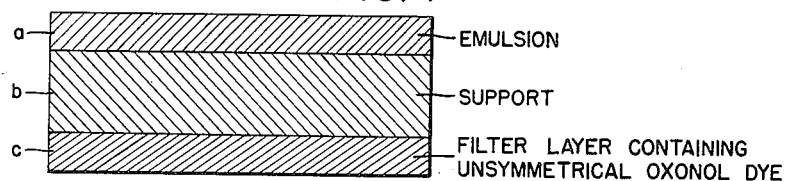
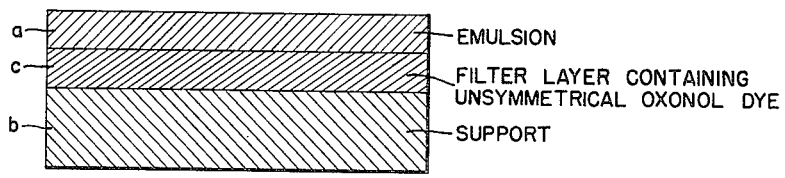
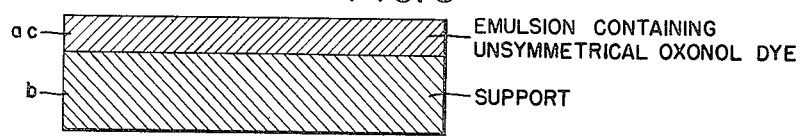

2,621,125

UNITED STATES PATENT OFFICE 2,621,125

LIGHT-SENSITIVE PHOTOGRAPHIC ELEMENT HAVING A LIGHT-ABSORBING LAYER

André Emile van Dormael, Heverlee-Louvain, and Laurent Aloys van der Auwera, Mortsel-Antwerp, Belgium, assignors to Gevaert Photo-Producten N. V., Mortsel-Antwerp, Belgium, a company of Belgium Application November 14, 1947, Serial No. 786,152
In Great Britain November 22, 1946

10 Claims. (Cl. 95—8)

This invention relates to photographic material comprising colored layers, especially anti-halation or filter layers, and to its manufacture.

Photographic material often comprises one or more layers containing dyestuffs. Such layers, which may be light-sensitive or non-light-sensitive layers of water-soluble colloids, such as gelatine, serve the purpose of reducing halation or producing a filtering action on the exposure light either in the camera or whilst printing or employed for fogging residual silver salt in reversal.

As dyestuffs for filter or anti-halation layers in photographic materials, it has been proposed to use symmetric oxonol dyestuffs corresponding to the following general formula:

$$O=C\underset{Z}{\diagdown}\diagup C=CH-CH=CH-CH=CH-C\underset{Z}{\diagdown}\diagup =C-OH$$

wherein Z is the atoms necessary to complete a heterocyclic nucleus.

An object of our present invention is to provide new colored photographic layers.

Another object of our invention is to provide new photographic materials comprising colored photographic layers.

A further object of this invention is to provide a process for the manufacture of such materials.

Still further objects will appear from the following description.

The foregoing and all the objects, which will hereinafter appear, are accomplished by applying to a photographic support or layer a layer containing an asymmetric oxonol dyestuff according to the following general formula:

$$O=C\underset{Z}{\diagdown}\diagup C=CH-CH=CH-CH=CH-C\underset{Z'}{\diagdown}\diagup =C-OH$$

wherein Z and Z' are the atoms necessary to complete different heterocyclic nuclei.

These new dyestuffs may be prepared, among other processes, by a method indicated by the following scheme:

$$O=C\underset{Z}{\diagdown}\diagup CH_2 + Ar-N=CH-CH=CH-CH=CH-NH-Ar \longrightarrow$$

$$O=C\underset{Z}{\diagdown}\diagup C=CH-CH=CH-CH=CH-NH-Ar \longrightarrow$$

$$H_2C\underset{Z'}{\diagdown}\diagup C=O$$

$$O=C\underset{Z}{\diagdown}\diagup C=CH-CH=CH-CH=CH-C\underset{Z'}{\diagdown}\diagup =C-OH$$

wherein Ar is aryl, and Z and Z' have the same significance as mentioned above.

The filter and anti-halation layers obtained with these asymmetrical dyestuffs have the advantage over the above mentioned known colored layers that their range of absorption can be adapted with greater ease since the possibility of varying the two atom groups Z and Z' offers a considerable number of combinations, each of them having different absorption characteristics.

Our invention may be applied to light-sensitive material having one or more light-sensitive silver halide emulsions on a support, the dyestuff being incorporated either in the emulsion layers or in separate colloid layers.

The specification is accompanied by a drawing in which:

Fig. 1 illustrates a photographic element embodying features of our invention;

Fig. 2 illustrates a modified photographic element; and

Fig. 3 illustrates another modification.

Referring to the drawing, in Figs. 1 and 2, $a$ designates an emulsion, $b$ a support, and $c$ a filter or antihalation layer. In Fig. 1, the filter layer is shown as a backing. In the embodiment of Fig. 2, the filter layer is interposed between the emulsion and the support. In Fig. 3, $ac$ is an emulsion layer having incorporated therein filter or antihalation substance, this layer being applied to the supporting layer $b$.

The photographic materials according to the present invention may include a support of any suitable transparent material, such as glass, cellulose ester or synthetic resin.

The following specific examples will illustrate our invention more clearly without limiting, however, its scope.

Example 1

2.5 g. of the dyestuff of the following formula:

$$O=C\underset{}{\diagdown}\diagup C=CH-CH=CH-CH=CH-C\underset{}{\diagdown}\diagup =C-OH$$

dissolved in 200 cm.$^3$ alcohol, are added to 800 cm.$^3$ of an aqueous gelatine solution containing 8 g. gelatine per 100 cm.$^3$ of water. After spreading this solution upon the back of a photographic material, a purplish-red layer is obtained.

The dyestuff may be obtained as follows: 5 g. 4 -(ω - anilido - Δ - 2:4 - pentadienylidene)- 1-phenyl-3-methyl-5-pyrazolone

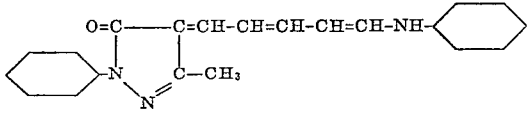

and 3 g. N-methyl-rhodanine are dissolved in 30 cm.³ pyridine and are refluxed for 3 hours in the presence of 6.5 cm.³ triethylamine. After cooling, the dyestuff is precipitated with ether. Melting point is 230° C. (with decomposition).

The intermediate product mentioned herein may be prepared in the following way: 5.25 g. 1-phenyl-3-methyl-5-pyrazolone and 8.55 g. glutacondialdehyde-dianilide-hydrochloride are refluxed for 3 minutes on the water bath in 60 cm.³ absolute ethyl alcohol in the presence of 4.2 cm.³ triethylamine. After cooling, the precipitated product is filtered and recrystallized from ethyl alcohol. Melting point is 185°–187° C.

*Example 2*

2 g. of the dyestuff of the following formula:

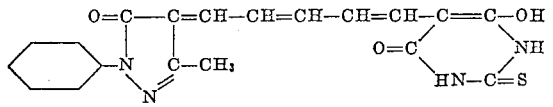

dissolved in 160 cm.³ alcohol, are added to 900 cm.³ of an aqueous gelatine solution containing 8 g. gelatine per 100 cm.³ water. After spreading this solution upon the back of a photographic material, an intense purple-red layer is obtained.

This dyestuff may be prepared as follows: 5 g. 4 - (ω - anilido - Δ - 2:4 - pentadienylidene) - 1 - phenyl-3-methyl-5-pyrazolone (the preparation has been described in the foregoing example) and 3 g. thiobarbituric acid in 30 cm.³ pyridine are refluxed for 30 minutes in the presence of 6.5 cm.³ triethylamine. After cooling, the dyestuff formed is precipitated with ether and recrystallized from alcohol. Melting point is at 240° C. (under decomposition).

*Example 3*

2 g. of the dyestuff of the following formula:

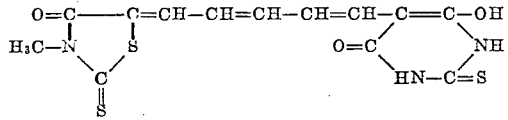

dissolved in 140 cm.³ alcohol, are added to 900 cm.³ of an aqueous gelatine solution containing 8 g. gelatine per 100 cm.³ water. After spreading this solution upon the back of a photographic material, an intense purple-red layer is obtained.

This dyestuff may be prepared in the following way: 10 g. 5-(ω-anilido-Δ-2:4-pentadienylidene) - 3-methyl-rhodanine

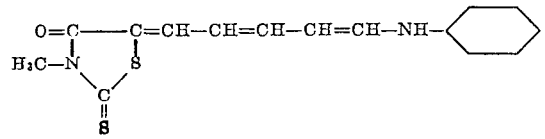

and 6 g. thiobarbituric acid are dissolved in 60 cm.³ pyridine and refluxed for 30 minutes in the presence of 14 cm.³ triethylamine. After cooling, the reaction mixture is precipitated with ether and recrystallized from alcohol. Melting point is 180° C. (with decomposition).

The intermediate product mentioned herein is obtained in the following way: 7.5 g. N-methyl-rhodanine and 14 g. glutacondialdehyde-dianilide-hydrochloride are dissolved in 100 cm.³ of absolute ethyl alcohol and refluxed for 5 minutes on the water bath in the presence of 7 cm.³ triethylamine. After cooling, the precipitated product is filtered and recrystallized from alcohol. Melting point is at 205° C.

*Example 4*

2 g. of the dyestuff of the following formula:

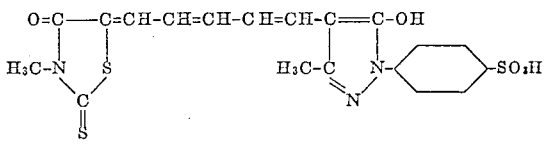

dissolved in 125 cm.³ water, are added to 875 cm.³ of an aqueous gelatine solution containing 8 g. gelatine per 100 cm.³ water. After spreading this solution upon the back of a photographic material, an intense purple-red layer is obtained.

This dyestuff may be prepared in the following way: 10 g. 5-(ω-anilido-Δ-2:4-pentadienylidene) - 3-methyl-rhodanine (mentioned in the foregoing example) and 8.5 g. 1-(p-sulphophenyl)-3-methyl-5-pyrazolone are dissolved in 70 cm.³ pyridine and refluxed for 3 hours in the presence of 14 cm.³ triethylamine. After cooling, the K-salt of the dyestuff is precipitated with KOH.

*Example 5*

2 g. of the dyestuff of the following formula:

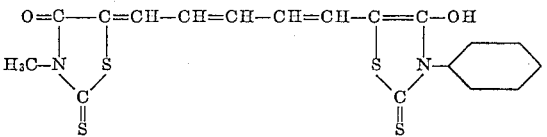

dissolved in 160 cm.³ alcohol, are added to 900 cm.³ of a gelatine solution containing 8 g. gelatine per 100 cm.³ water. After spreading this solution upon the back of a photographic material, an intense purple-red layer is obtained.

This dyestuff may be prepared in the following way: 10 g. 5-(ω-anilido-Δ-2:4-pentadienylidene) - 3-methyl-rhodanine (described in Example 3) and 7 g. N-phenyl-rhodanine are dissolved in 70 cm.³ pyridine and refluxed for 3 hours in the presence of 14 cm.³ triethylamine. After cooling, the product is precipitated with ether. Melting point is 113° C. (with decomposition).

We claim:

1. Photographic element comprising a support having thereon a light-sensitive silver halide emulsion layer and a colored layer containing an asymmetric oxonol dyestuff according to the general formula:

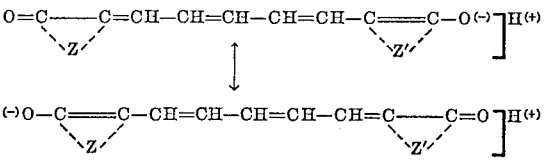

wherein Z and Z′ are different and represent the atoms necessary to complete a member selected from the group consisting of 1-phenyl-3-methyl-5-pyrazolone, 1-(p-sulphophenyl)-3-methyl - 5-pyrazolone, N-methyl-rhodanine, N-phenyl-rhodanine, and thiobarbituric acid.

2. Photographic element comprising a support having thereon a light-sensitive silver halide emulsion layer and a filter layer containing an asymmetric oxonol dyestuff according to the general formula:

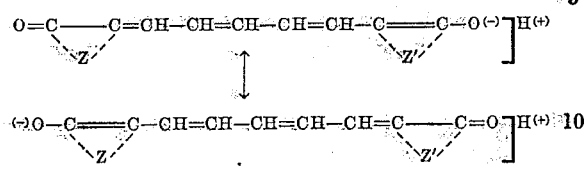

wherein Z and Z' are different and represent the atoms necessary to complete a member selected from the group consisting of 1-phenyl-3-methyl-5-pyrazolone, 1-(p-sulphophenyl)-3-methyl - 5-pyrazolone, N-methyl-rhodanine, N-phenyl-rhodanine, and thiobarbituric acid.

3. Photographic element comprising a support having thereon a light-sensitive silver halide emulsion layer and an anti-halation layer containing an asymmetric oxonol dyestuff according to the general formula:

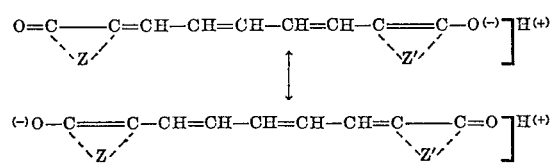

wherein Z and Z' are different and represent the atoms necessary to complete a member selected from the group consisting of 1-phenyl-3-methyl-5-pyrazolone, 1-(p-sulphophenyl)-3-methyl - 5-pyrazolone, N-methyl-rhodanine, N-phenyl-rhodanine, and thiobarbituric acid.

4. Photographic element comprising a support having thereon a light-sensitive silver halide emulsion layer and an anti-halation layer containing an asymmetric oxonol dyestuff according to the general formula:

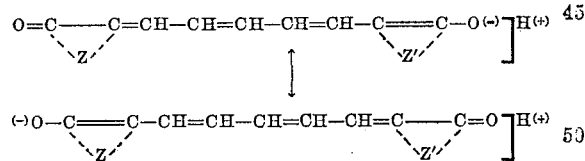

wherein Z represents the atoms necesary to complete a member selected from the group consisting of 1-phenyl-3-methyl-5-pyrazolone, and 1-(p-sulphophenyl)-3-methyl-pyrazolone, and Z' represents the atoms necessary to complete a member selected from the group consisting of N-methyl-rhodanine, N-phenyl-rhodanine, and thiobarbituric acid.

5. Photographic element comprising a support having thereon a light-sensitive silver halide emulsion layer and an anti-halation layer containing an asymmetric oxonol dyestuff according to the general formula:

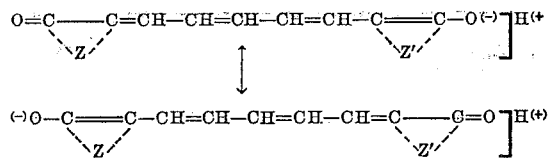

wherein Z represents the atoms necessary to complete a member selected from the group consisting of N-methyl-rhodanine, and N-phenyl-rhodanine, and Z' represents the atoms necessary to complete a member selected from the group consisting of 1-phenyl-3-methyl-5-pyrazolone, 1-(p-sulphophenyl)-3-methyl-5-pyrazolone, and thiobarbituric acid.

6. Photographic element comprising a support having thereon a light-sensitive silver halide emulsion layer and an anti-halation layer containing an asymmetric oxonol dyestuff according to the general formula:

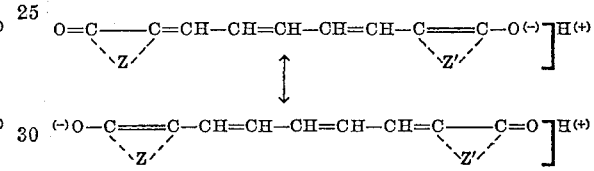

wherein Z represents the atoms necessary to complete thiobarbituric acid and Z' represents the atoms necessary to complete a member selected from the group consisting of 1-phenyl-3-methyl-5-pyrazolone, 1 - (p - sulphophenyl) - 3-methyl-5-pyrazolone, N-methyl-rhodanine, and N-phenyl-rhodanine.

7. Photographic element comprising a support having thereon a light-sensitive silver halide emulsion layer and an anti-halation layer containing an asymmetric oxonol dyestuff according to the formula:

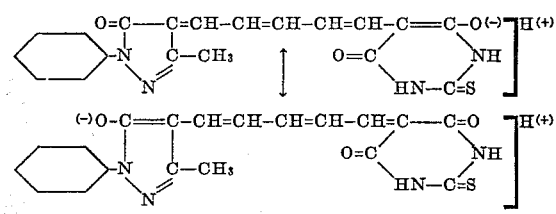

8. Photographic element comprising a support having thereon a light-sensitive silver halide emulsion layer and an anti-halation layer containing an asymmetric oxonol dyestuff according to the formula:

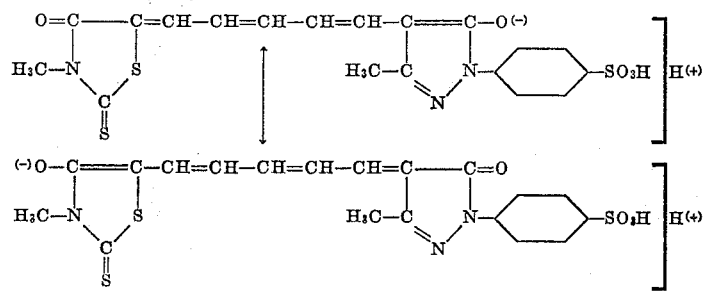

9. Photographic element comprising a support having thereon a light-sensitive silver halide emulsion layer and an anti-halation layer containing an asymmetric oxonol dyestuff according to the formula:

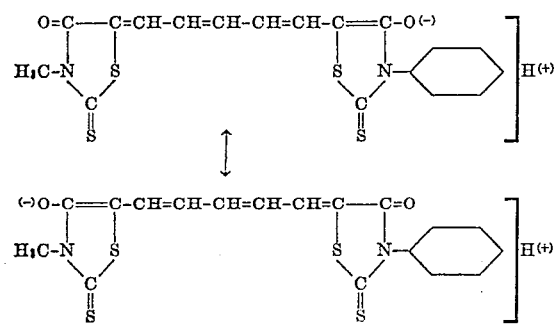

10. A photographic element comprising a support having thereon at least one photosensitive silver halide emulsion layer and a light absorbing layer containing a dye having the formula:

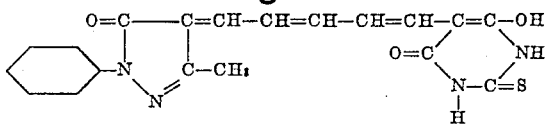

ANDRÉ EMILE VAN DORMAEL.
LAURENT ALOYS VAN DER AUWERA.

REFERENCES CITED

The following references are of record in the file of this patent:

UNITED STATES PATENTS

| Number | Name | Date |
| --- | --- | --- |
| 2,032,506 | Schneider | Mar. 3, 1936 |
| 2,036,546 | Schneider | Apr. 7, 1936 |
| 2,220,123 | Schwarc | Nov. 5, 1940 |
| 2,241,238 | Brooker et al. | May 6, 1941 |
| 2,274,782 | Gaspar | Mar. 3, 1942 |
| 2,345,193 | Gaspar | Mar. 28, 1944 |